(12) United States Patent
Prine

(10) Patent No.: US 7,677,589 B2
(45) Date of Patent: Mar. 16, 2010

(54) HITCH COVER

(76) Inventor: Gary V. Prine, 3758 Hickory Grove Rd., Valdosta, GA (US) 31606

( * ) Notice: Subject to any disclaimer, the term of this patent is extended or adjusted under 35 U.S.C. 154(b) by 76 days.

(21) Appl. No.: 12/069,264

(22) Filed: Feb. 8, 2008

(65) Prior Publication Data

US 2009/0200771 A1    Aug. 13, 2009

(51) Int. Cl.
*B60D 1/60* (2006.01)
(52) U.S. Cl. ...................................... 280/507
(58) Field of Classification Search ................. 280/507, 280/770; 150/166, 167; 293/142
See application file for complete search history.

(56) References Cited

U.S. PATENT DOCUMENTS

| | | | |
|---|---|---|---|
| 3,596,926 A | 8/1971 | Randall | |
| 5,037,122 A | 8/1991 | Beckerer, Jr. | |
| 5,297,407 A * | 3/1994 | Tarr | 70/232 |
| 5,533,743 A | 7/1996 | Bello | |
| 5,651,559 A | 7/1997 | Liland et al. | |
| 5,791,677 A | 8/1998 | Froehlich | |
| 6,039,339 A | 3/2000 | Bello | |
| 6,322,094 B1 | 11/2001 | Poe | |
| 6,832,775 B1 | 12/2004 | Muller | |
| 6,938,912 B1 | 9/2005 | Norton et al. | |
| 2003/0085548 A1 | 5/2003 | Morgan | |
| 2006/0017261 A1 * | 1/2006 | Rickey | 280/507 |

* cited by examiner

*Primary Examiner*—Tony H. Winner
(74) *Attorney, Agent, or Firm*—John P. Sinnott; Langdale Vallotton, LLP

(57) ABSTRACT

The hitch cover is adaptable to several commercially available trailer hitches. The cover has a flat portion with a hexagonal recess, the recess being about 3 inches across opposite corners. A protective portion, generally perpendicular to the flat portion has a "U" shape and provides a polyurethane padding approximately 1.25 inches thick and 3 inches in depth. A steel plate, interposed between the flat portion and the perpendicular portion, has a hole, the center of which is in alignment with the center of the hexagonal recess. The semicircular portion of the "U" shaped protective portion, moreover, has a general diameter of 5.25 inches between opposite external surfaces of the protective portion and the parallel arms of the "U" shape protruding about 3.75 inches from the semicircular portion.

2 Claims, 2 Drawing Sheets

HITCH COVER

CROSS-REFERENCES TO RELATED APPLICATIONS

None

STATEMENT REGARDING FEDERALLY SPONSORED RESEARCH OR DEVELOPMENT

None

JOINT RESEARCH AGREEMENT PARTIES

None

REFERENCE TO "SEQUENCE LISTING"

None

BACKGROUND OF THE INVENTION

1. Field of the Invention

This invention relates to a cover for a trailer hitch and more particularly to a hitch cover that is spaced from the ball hitch on a trailer bracket to protect personnel from contact with the ball or the bracket, the shape and dimensions of the hitch cover being sufficient to accommodate use of the hitch cover with a broad range of trailer hitch configurations, and the like.

2. Summary of the Prior Art

Hitch covers that characterized the prior art often have a horizontally disposed bottom that forms a recessed hitch bar seat in which the hitch bar is mounted. The recess in the bottom of the hitch pad fixes the size of the mounting for the hitch bar. In this circumstance, the hitch cover body can be attached to only a limited number of trailer hitches, that is, those few styles of hitches in which the hitch bar can be seated property in the hitch bar recess. This situation imposes a requirement for the user of a different hitch design either to spend time searching for a hitch cover that will fit the specific trailer hitch or, in default of finding a suitable hitch cover, to risk leg bruises, cuts and stained clothing from accidental contact with a greased ball or the bare end of the hitch bar.

Thus, there is a need for a hitch cover that can be adapted to most, if not all, of the broad range of trailer hitch configurations that are on the market.

SUMMARY OF THE INVENTION

These and other difficulties are largely overcome through the practice of the invention. For example, a hitch cover in accordance with salient features of the invention has a thick padding of molded polyurethane, the padding having a flat portion and an attached portion that is generally perpendicular to the flat portion. The flat portion of the padding overlays a thin but sturdy plate. A hexagonal hole is formed in the flat portion, the hexagonal hole being in alignment with a circular hole formed in the plate. The perpendicular portion of the padding, moreover, has a generally "U" shape, the semicircular part of the "U" being spaced radially from the aligned centers of the hexagonal hole in the flat portion of the padding and the hole in the plate to the outer surface of the perpendicular portion through a distance that is adequate to prevent clothing and the like from brushing against a hitch ball that protrudes perpendicularly from the flat portion of the padding.

The parallel arms of the "U" shaped padding extend from a plane established by the center of the circular hole and the ends of the semicircular part of the "U" shape through a distance that is not more than the minimum extended length of the shortest commercially available trailer bracket. When assembled in the foregoing manner, the hitch cover as claimed herein is suitable not only for installation on most commercial trailer hitches, but also will protect clothing from becoming soiled through accidental contact with the hitch ball or personal injury through physical contact with parts of the trailer hitch structure.

These and other features that characterize the invention are illustrated in the following detailed description of a preferred embodiment of the invention. The scope of the invention, however, is limited only through the claims appended hereto.

DETAILED DESCRIPTION OF PREFERRED EMBODIMENT OF THE INVENTION

Figure 2:
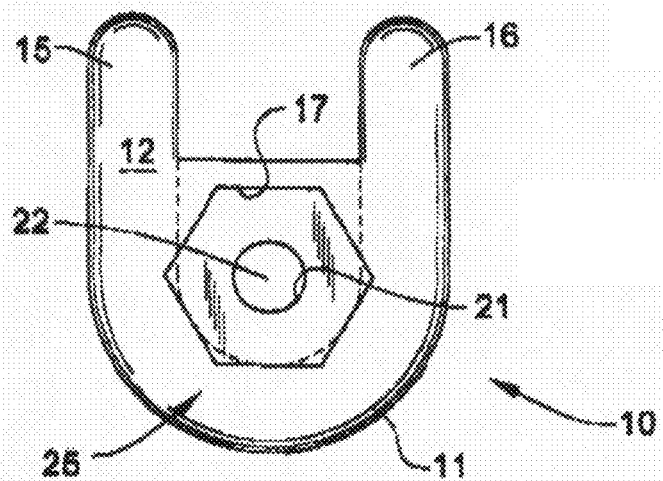
FIG. 2 is a plan view of the hitch cover shown in FIG. 1.
Figure 3:
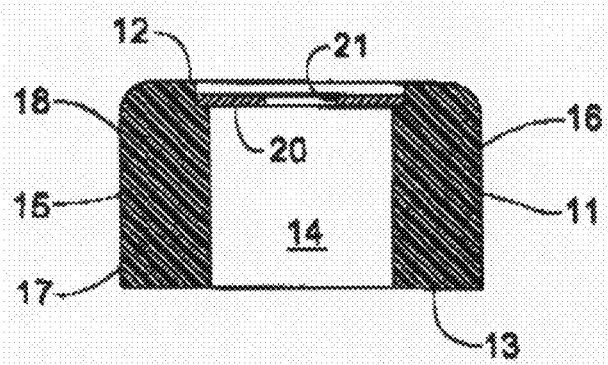
FIG. 3 is a side elevation in full section of the hitch cover shown in FIG. 1 viewed in the direction of the arrows A-A of FIG. 2.
Figure 4:
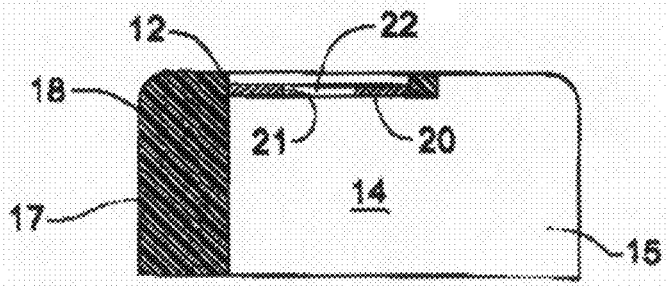
FIG. 4 is a side elevation in full section of the hitch cover shown in FIG. 1, viewed in the direction of the arrows B-B of FIG. 2.

For a more complete appreciation of the invention, attention is invited to FIG. 2 which shows a hitch cover 10 that has a padding 11 molded in the shape of the letter "U". As illustrated in FIG. 3, the padding 11 has a generally flat layer or portion 12 joined to a thick perpendicular element or protective portion 13 of polyurethane or other suitable material. A thickness for the protective portion 13 of about 1.25 inches and a length, or depth 18 of about 3 inches, moreover, have been found suitable for most applications of the invention. The configuration of the 'V' shaped padding 11 shown in FIG. 2, also for the purpose of the invention has a separation between parallel arms 15, 16 of about 2.75 inches (the arms each protruding about 3.75 inches from semicircular part 25 of the "U" shaped padding 11). The semicircular part 25 of the "U" shaped padding 11 thus has a preferred diameter also of about 5.25 inches between opposite exterior surfaces of the padding 11. When taken with the parallel arms 15, 16 and the semicircular part 25 of the protective portion 13, a hollow center 14 (FIGS. 3 and 4) is created.

Also best illustrated in FIG. 2, a hexagonal recess 17 is formed in the flat portion 12, the recess 17 also having a width of about 3 inches across its opposite corners.

Secured within the hitch cover 10 and located between the flat portion 12 and the protective portion 13 (best shown in FIG. 4) is a thin plate 20 of steel, very hard plastic or other suitable material. A hole 21 with a diameter of approximately 1 inch is formed in the plate 20, the center of the hole 21 being in registration with center 22 of the hexagonal recess 17 in the flat portion 12 of the polyurethane padding.

Figure 1:
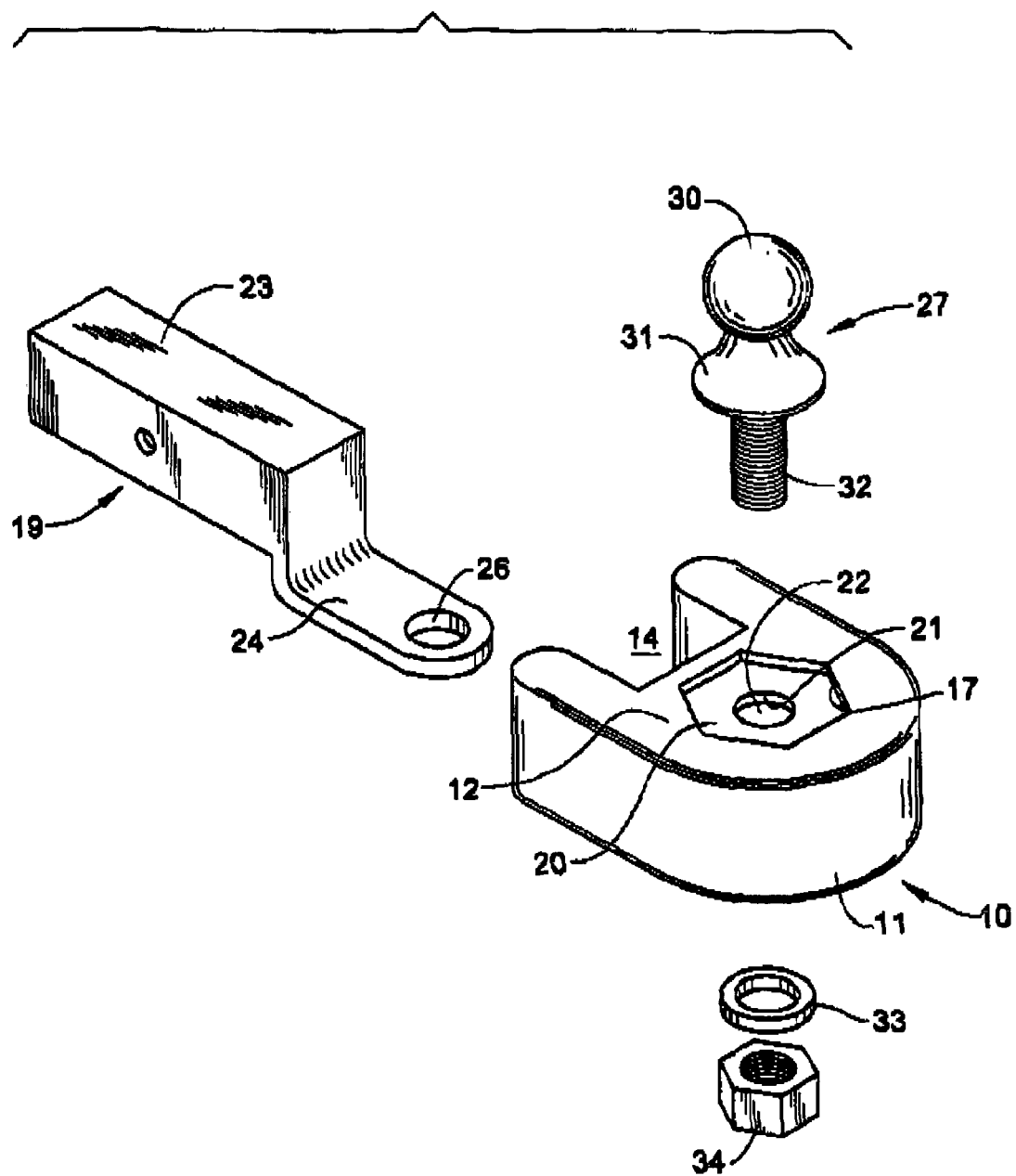
FIG. 1 is a perspective exploded assembly view of a typical trailer hitch with a hitch cover that characterizes the invention.

A typical commercially available trailer hitch 19 shown in FIG. 1 has a trailer bracket 23 that protrudes from the rear of a towing vehicle (not shown in the drawing). A tongue 24 extends rearwardly from the trailer bracket and, near the rearward end of the tongue 24 a bore 26 of about 1 inch in diameter is formed in the tongue 24. The tongue 24 is inserted into the hollow center 14 of the hitch cover 10 and aligned with the center 22 of the hexagonal recess 17 in the flat portion 12 of the padding 11.

A ball hitch 27 has a ball 30 that is joined to a circular base 31. A threaded shank 32 aligned with the center 22 of the hexagonal recess 17 protrudes from the circular base 31 and through not only the recess 17, but also through the aligned centers of the hole 21 in the plate 20 and the bore 26.

The circular base 31 bears directly against the exposed portion of the plate 20. To secure the ball hitch 27 to the tongue 24 and the trailer bracket 23, a washer 33 is pressed over the part of the shank 32 that extends through the hole 21 in the plate 20 and the bore 26 in the tongue 24. A nut 34 is threaded onto the shank 32 and tightened against the washer 33 and the tongue 24 in order to secure the ball hitch 27 and the hitch cover 10 to the trailer hitch 19.

In operation, the ball 30, usually covered with grease and grime, must be coupled to a corresponding socket on the vehicle being towed (not shown in the drawing). As a consequence, with the hitch cover 10 in place on the trailer hitch 19, it has been found that for many commercial trailer hitches the physical separation established by the padding 11 protects trouser pant legs, riding britches and the like from brushing against the usual grease and grime covered ball 30 on the ball hitch 27. But the hitch cover 10 also protects personnel from being cut or suffering abrasions through accidental physical contact with the otherwise exposed metal parts that constitute the trailer hitch 19.

To accommodate a wide variety of trailer hitch configurations, the hexagonal recess 17 formed in the flat portion 12 of the padding 11 enables a ball hitch that has a hexagonal base (not shown in the drawing) to fit snugly against the plate 20. In this manner a good, solid connection can be effected for the ball hitch and the hitch cover 10 with the tongue 24 and the trailer bracket 23 for ball hitches with hexagonal bases.

What is claimed is:

1. A protective cover for a trailer hitch comprising a thick padding having a flat portion and a portion generally perpendicular to said flat portion, said generally perpendicular portion of said thick padding being of polyurethane of about 1.25 inches thick to a depth of about 3 inches said flat portion having a recess formed therein, said generally perpendicular portion having a "U" shape, said "U" shape of said perpendicular portion has a semicircular part with a diameter of about 5.25 inches, wherein said "U" shape of said perpendicular portion has a pair of generally parallel arms each protruding about 3.75 inches from said semicircular part, a plate within said thick padding interposed between said flat portion and said perpendicular portion, said plate having a hole formed therein, said hole being aligned with said flat portion recess.

2. A protective cover for a trailer hitch according to claim 1 wherein said flat portion recess is hexagonal, said hexagonal recess having a width of about 3 inches across opposite corners.

\* \* \* \* \*